Patented Apr. 19, 1949

2,468,003

UNITED STATES PATENT OFFICE 2,468,003

METHOD OF MANUFACTURING A SELENIUM BLOCKING-LAYER CELL

Willem Christiaan van Geel and Ludovicus Augustinus Lambertus Esseling, Eindhoven, Netherlands, assignors to Hartford National Bank & Trust Co., Hartford, Conn., trustee No Drawing. Application September 18, 1945, Serial No. 617,162. In the Netherlands July 24, 1941

Section 1, Public Law 690, August 8, 1946 Patent expires July 24, 1961

9 Claims. (Cl. 175—366)

This invention relates to a method of manufacturing a selenium blocking-layer cell. It has a principal object to obtain a selenium electrode having a very compact and coherent composition and properly adhering to the substratum.

It is common practice for obtaining a selenium electrode of good conductivity to subject the selenium after application to a carrier to heat treatment at temperature just below the melting point of selenium, i. e. 200° C. Generally, immediately upon its application to the carrier plate the selenium layer has the amorphous vitreous structure which is practically non conducting. In order to reach the above-mentioned temperature of 200° C. it is necessary to pass through a temperature range which lies between 115 and 150° C. and within which the selenium becomes more or less liquid. In this range alterations occur in the coherence of the layer which are attempted to be favourably influenced according to a well-known method by the exertion of feed pressure.

According to the invention, the disadvantages occurring during the passage through this temperature range are counteracted more conclusively and in addition the pressing operation may be left out at this stage. This is obtained by mounting the selenium in a layer on a carrier plate and then providing the selenium layer with a covering layer which is in intimate contact with the selenium and at a temperature of 150° C. conserves its consistency and texture, the selenium being then made to assume a temperature above 150° C. up to close below the melting point for the purpose of converting the selenium into the modification of good conductivity, after which the blocking layer and the complementary electrode are applied.

Before subjecting the selenium to a heat treatment which is intended to render the entire selenium layer conductive, this layer is provided with a covering layer which on passing through the first melting temperature completely conserves its nature. Due to the fact that the selenium is in intimate contact with this covering layer and the latter does not contract the selenium layer conserves its texture even on passing through the melting temperature and on being precipitated by crystallisation. Thus, according to this theory, the covering layer which in practice is found to lead to the manufacture of very good cells operates as a kind of cuirassing. The covering layer may be removed after having performed its operation and various other possibilities arise, as will become evident from the practical examples hereinafter described.

According to a first embodiment, use is initially made in the usual manner of a carrier plate, for which iron may be chosen, and this has applied to it in succession a layer of zinc and a layer of carbon for the obtainment of satisfactory adhesion of the selenium layer which is then applied in a liquid state. The liquid selenium may be distributed uniformly over the surface in various ways, for example by quick rotation of the carrier plate or by guiding the carrier plates which have a more or less viscous selenium material spread on them through rolls. The selenium is previously provided with one or more admixtures which assist in obtaining good conductivity in the subsequent heat treatment and which may also participate in the formation of a blocking layer on the selenium.

The zinc and carbon layers have a thickness of only some few microns each, whereas the selenium layer is for example 0.1 mm. thick.

Next the covering layer which forms part of the invention is applied by painting. For this purpose use may be made for example of polymetacrylester or chlorinated rubber lacquer. This is applied in a layer for example of 0.5 mm. per thickness. This lacquer adheres closely to the selenium and a rigid coherent layer is obtained.

The plate thus prepared carrying the layer applied to it is then introduced into a furnace having a temperature of about 200° C. The selenium layer will pass very quickly through the temperature zone comprised between 115 and 150° C. where the selenium becomes transiently liquid, the crystalline structure being then set up. At this stage the intimately contacting covering layer will prevent the selenium layer from changing its form in a harmful manner.

On continued sojourn of the plate in the furnace the layer of lacquer, if made up of metacrylester, is removed by volatilisation. Chlorinated rubber lacquer is removed by solution.

Next, the production of a blocking layer may be assisted within the same furnace by spraying it with a basic substance such as pyridine, aniline or toluidine, particularly when the admixtures previously added are constituted by halogenides, such for example as titanium chloride, zinc chloride, bismuth iodide, aluminium bromide.

The treatment in the furnace at 200° C. may last a total amount of several hours. It is allowed to go on until the selenium layer is wholly converted into the crystalline structure.

The complementary electrode is then applied outside the furnace after the selenium disc is allowed to cool and for this purpose a layer of a low-melting alloy for example of tin, bismuth and cadmium may be applied by spraying.

If the covering layer is made of chlorinated rubber lacquer, toluene for example may be used as the solvent. On the plate being then introduced into a furnace at about 200° C. the selenium does not re-start melting and the compact layer already obtained will consequently be maintained. In addition, the temperature treatment in the furnace only serves to secure the desired conductivity and in some cases to apply the blocking layer.

As an alternative, the blocking layer may be formed by non-genetic treatment by applying an insulating layer to the selenium layer by painting or by volatilisation. This blocking layer may be used at the same time as a covering layer according to the invention although in this case the covering layer has to be constructed much thinner than in the practical example indicated above since the thickness of this blocking layer is preferably not more than several tens of microns. For this combined purpose a blocking layer of silica for example may be used.

According to a further practical example use is made of a plate to which the selenium is applied in the manner described in the first practical example, the same admixtures being permitted to be used for the selenium. This plate is then washed for 10 seconds in a basic liquid, preferably a solution in water or alcohol having an alkaline reaction, for example potassium hydroxide in water or potassium sulphide in alcohol in a half-weight-percentage solution. These substances slightly dissolve the selenium superficially and cause the appearance of a blocking layer, and at the same time the surface of the selenium is converted into the crystalline (ash-coloured) structure. Thus a covering layer is produced which during the subsequent temperature treatment wholly conserves its texture and consistency and hence does not even become liquid on passing through the temperature zone comprised between 115 and 150° C.

Next, this plate is introduced into a furnace at 200° C. for the complete conversion of the selenium into the crystalline structure, the previously formed covering layer of crystalline selenium preventing the residue of the selenium layer from changing its form in a disturbing manner on passing through the temperature zone comprised between 115 and 150° C.

For the purpose of strengthening the blocking layer substances may still be applied by spraying within the furnace, as described in the first practical example.

What we claim is:

1. In the manufacture of a selenium blocking layer cell, the method comprising the steps of forming a layer of amorphous selenium, applying a protective coating in intimate contact with said selenium layer whereby the consistency of said selenium layer is conserved during subsequent heating thereof, heating the so-coated selenium layer to a temperature at which the selenium is converted to a conducting modification thereof, removing the protective coating from said selenium layer, and thereafter applying a counter-electrode to said selenium layer.

2. In the manufacture of a selenium blocking layer cell, the method comprising the steps of forming a layer of amorphous selenium, applying a protective coating in intimate contact with said selenium layer whereby the structure of the selenium is preserved while passing through the liquid phase, heating the so-coated selenium layer to a temperature not greater than 200° C. and at which the selenium is converted to a conducting modification thereof, removing said protective coating from said selenium layer, and thereafter applying a counter-electrode to said selenium layer.

3. In the manufacture of a selenium blocking layer cell, the method comprising the steps of forming a layer of amorphous selenium, applying a coating of protective lacquer to said selenium layer, heating the so-coated selenium layer to a temperature not greater than 200° C. and at which the selenium is converted to a conducting modification thereof, removing said lacquer coating at a temperature greater than about 150° C., and thereafter applying a counter-electrode to said selenium layer.

4. In the manufacture of a selenium blocking layer cell, the method comprising the steps of forming a layer of amorphous selenium, applying a protective coating of a lacquer consisting of a metacrylester to said selenium layer, heating the so-called selenium layer to a temperature at which the selenium is converted to a conducting modification thereof, removing said lacquer coating by volatilization at a temperature in excess of about 150° C., and thereafter applying a counter-electrode to said selenium layer.

5. In the manufacture of a selenium blocking layer cell, the method comprising the steps of forming a layer of amorphous selenium, applying a protective coating consisting of organic material to said selenium layer, heating the so-coated selenium layer to a temperature in excess of 150° C. and thereafter removing said organic coating with a solvent, and further heating the selenium layer to a temperature not greater than 200° C. and at which the selenium is converted to a conducting modification thereof.

6. In the manufacture of a selenium blocking layer cell, the method comprising the steps of forming a layer of amorphous selenium, applying a protective coating consisting of chlorinated rubber lacquer to said selenium layer to a temperature in excess of 150° C. and thereafter removing said lacquer coating with an organic solvent, and further heating the selenium layer to a temperature not greater than 200° C. and at which the selenium is converted to a conducting modification thereof.

7. The method of manufacturing a selenium blocking layer cell comprising the steps of forming a layer of amorphous selenium, applying a coating of protective lacquer to said selenium layer, heating the so-coated selenium layer to a temperature in excess of 150° C. and thereafter removing said lacquer coating, further heating the selenium layer to a temperature not greater than 200° C. and at which the selenium is converted to a conducting modification thereof, applying a blocking layer to the conducting layer of selenium, and applying a counter-electrode to said blocking layer.

8. The method of manufacturing a selenium blocking layer cell comprising the steps of forming a layer of amorphous selenium, applying a protective coating of a lacquer consisting of a metacrylester to said selenium layer, heating the so-coated selenium layer to a temperature in excess of 150° C. and at which said lacquer coating is volatilized, further heating the selenium layer to a temperature not greater than 200° C. and at which the selenium is converted to a conducting modification thereof, applying a blocking layer to the conducting layer of selenium, and applying a counter-electrode to said blocking layer.

9. The method of manufacturing a selenium blocking layer cell comprising the steps of forming a layer of amorphous selenium, applying a protective coating consisting of chlorinated rubber lacquer to said selenium layer, heating the so-coated selenium layer to a temperature in excess of 150° C. and thereafter dissolving said lacquer coating with an organic solvent, further heating the selenium layer to a temperature not greater than 200° C. and at which the selenium is converted to a conducting modification thereof, applying a blocking layer to the conducting layer of selenium, and applying a counter-electrode to said blocking layer.

WILLEM CHRISTIAAN VAN GEEL.
LUDOVICUS AUGUSTINUS
LAMBERTUS ESSELING.

REFERENCES CITED

The following references are of record in the file of this patent:

UNITED STATES PATENTS

| Number | Name | Date |
|---|---|---|
| 1,743,160 | Presser | Jan. 14, 1930 |
| 2,139,731 | De Baer | Dec. 13, 1938 |
| 2,264,464 | Van Geel | Dec. 2, 1941 |
| 2,375,355 | Lindblad et al. | May 8, 1945 |

Certificate of Correction

Patent No. 2,468,003.  April 19, 1949.

WILLEM CHRISTIAAN VAN GEEL ET AL.

It is hereby certified that error appears in the printed specification of the above numbered patent requiring correction as follows:

Column 4, line 27, claim 4, for the words and hyphen "so-called" read *so-coated*; and that the said Letters Patent should be read with this correction therein that the same may conform to the record of the case in the Patent Office.

Signed and sealed this 26th day of July, A. D. 1949.

[SEAL]

THOMAS F. MURPHY,
*Assistant Commissioner of Patents.*